US011975245B2

(12) United States Patent
Kim et al.

(10) Patent No.: US 11,975,245 B2
(45) Date of Patent: May 7, 2024

(54) GOLF BALL AND MANUFACTURING METHOD THEREFOR

(71) Applicants: ATTOMETAL TECH PTE. LTD., Singapore (SG); ATTOMETAL TECH KOREA INC., Gimpo (KR)

(72) Inventors: Choongnyun Paul Kim, Seoul (KR); Jae Kyu Park, Gimpo (KR)

(73) Assignees: ATTOMETAL TECH PTE. LTD., Singapore (SG); ATTOMETAL TECH KOREA INC., Gimpo (KR)

( * ) Notice: Subject to any disclaimer, the term of this patent is extended or adjusted under 35 U.S.C. 154(b) by 0 days.

(21) Appl. No.: 18/001,948

(22) PCT Filed: Jun. 16, 2021

(86) PCT No.: PCT/KR2021/007560
§ 371 (c)(1),
(2) Date: Dec. 15, 2022

(87) PCT Pub. No.: WO2021/256856
PCT Pub. Date: Dec. 23, 2021

(65) Prior Publication Data
US 2023/0226415 A1     Jul. 20, 2023

(30) Foreign Application Priority Data
Jun. 16, 2020 (KR) .................. 10-2020-0073179
Jun. 16, 2021 (KR) .................. 10-2021-0077924

(51) Int. Cl.
*A63B 37/06* (2006.01)
*A63B 37/00* (2006.01)
*A63B 45/00* (2006.01)

(52) U.S. Cl.
CPC .......... *A63B 45/00* (2013.01); *A63B 37/0039* (2013.01); *A63B 37/0045* (2013.01); *A63B 37/0047* (2013.01); *A63B 37/0064* (2013.01); *A63B 37/0066* (2013.01); *A63B 37/0075* (2013.01); *A63B 37/0091* (2013.01)

(58) Field of Classification Search
CPC ............ A63B 37/0039; A63B 37/0047; A63B 37/0075; A63B 37/0082
See application file for complete search history.

(56) References Cited

U.S. PATENT DOCUMENTS

| 6,106,414 A | * | 8/2000 | Yeh | ..................... A63B 37/0003 |
| | | | | 473/375 |
| 2007/0281800 A1 | * | 12/2007 | Makino | .................. A63B 37/06 |
| | | | | 473/378 |
| 2019/0232366 A1 | * | 8/2019 | Gong | .................... B29C 64/165 |

FOREIGN PATENT DOCUMENTS

| JP | H1176459 A | 3/1999 |
| KR | 20010000252 A | 1/2001 |
| KR | 101559923 B1 | 10/2015 |

* cited by examiner

*Primary Examiner* — Raeann Gorden
(74) *Attorney, Agent, or Firm* — Harvest IP Law, LLP

(57) ABSTRACT

A golf ball according to the present invention comprises: a core having a diameter of 37-39 mm and a first density; a mantle which surrounds the core, includes amorphous alloy powder, and has a thickness of 0.8-1.2 mm and a second density; and a cover which surrounds the mantle and has a thickness of 1-1.4 mm and a third density.

8 Claims, 1 Drawing Sheet

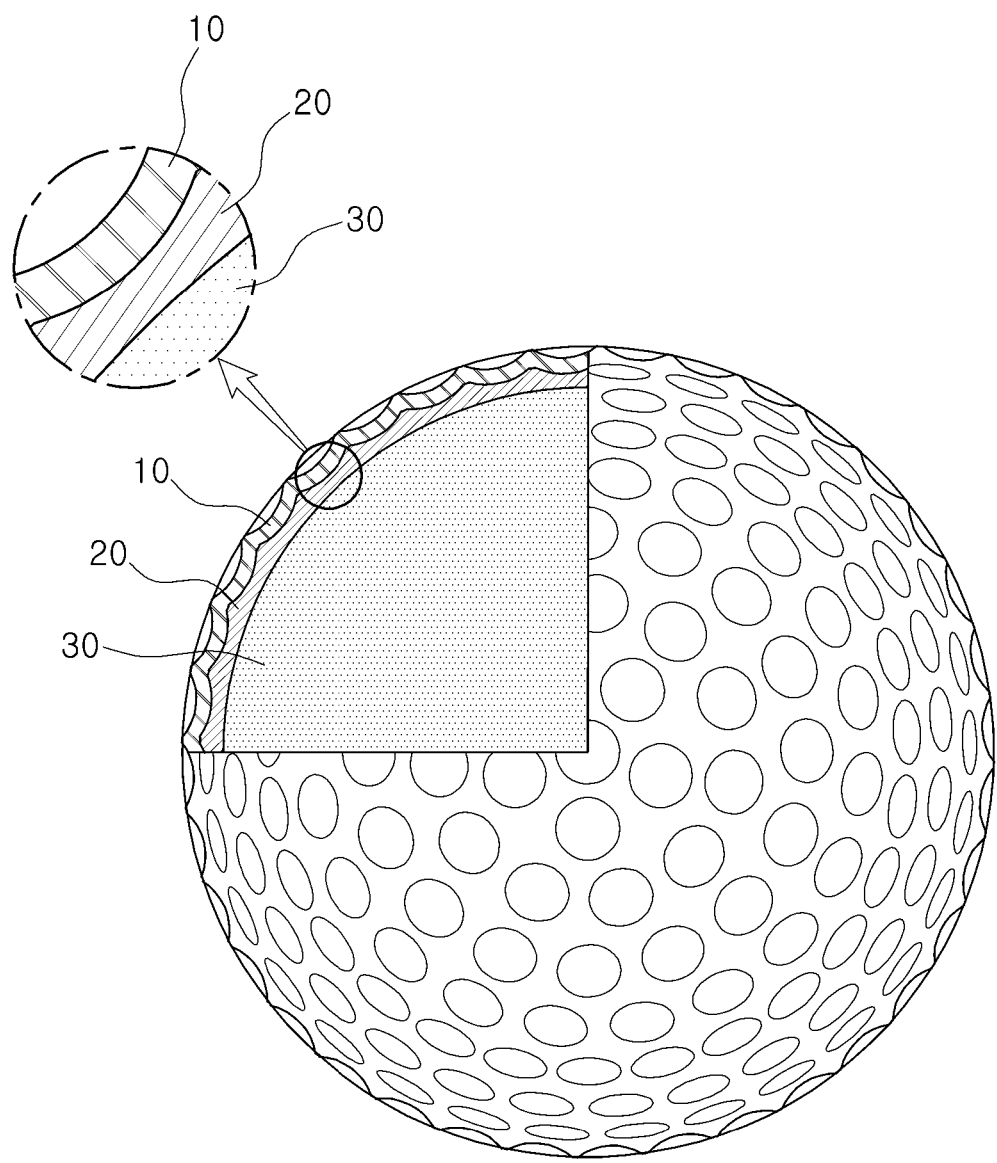

GOLF BALL AND MANUFACTURING METHOD THEREFOR

CROSS REFERENCE TO RELATED APPLICATION(S)

This application is a National Stage of International Application No. PCT/KR2021/007560 filed Jun. 16, 2021, claiming priority based on Korean Patent Application No. 10-2020-0073179 filed Jun. 16, 2020 and Korean Patent Application No. 10-2021-0077924 filed Jun. 16, 2021, the disclosures of which are incorporated herein by reference in their entireties.

TECHNICAL FIELD

The present invention relates to a golf ball including an amorphous metal powder.

BACKGROUND ART

A golf ball is a ball used in golf, and a certified golf ball is defined to have a weight of 45.93 g or less and a diameter of 42.67 mm or more, which is because momentum thereof may increase or air resistance applied thereto may decrease, as a weight of a golf ball becomes heavier or a size thereof becomes smaller. Accordingly, some golf balls are used as non-certified golf balls having a smaller size and increased weight according to the needs of the user.

A golf ball consists of a core and a structure in which two to three or more outer skin layers covering the core are formed. A material of the core and a material of the outer skin layer surrounding the core are major factors determining trajectory, driving distance, and the like, of a golf ball.

In this case, in general, a golf ball is comprised of a highly elastic core formed of polybutadiene rubber and a cover formed of a polyurethane or ionomer plastic material, and an intermediate layer, also known as an outer core, an inner cover, or the like may be provided between the core and the cover.

That is, the core is a highly elastic material determining the driving distance of the golf ball, the cover is a protective layer preventing abrasion of the golf ball, and the middle layer may be comprised of various materials for improving the amount of spin or the distance depending on the material of the cover. For example, when the cover is formed of a material having highly elasticity, a material for increasing hardness is used as an intermediate layer, and when the cover is formed of a material having high hardness, a material for increasing elasticity can be used as an intermediate layer.

However, when a material opposite to the elasticity or hardness is used for the intermediate layer, a disadvantageous function may occur in the design of the overall density balance of the golf ball or the moment of inertia.

In addition, conventional golf balls are designed to focus on the driving distance or the amount of rotation during the swing thereof, and thus, almost no products have been developed for golf balls exhibiting advantageous functions during approach or putting.

PRIOR ART DOCUMENT (Patent Document) Korean Patent Publication No. 20010000252 (2001.01.05)

SUMMARY OF INVENTION

Technical Problem

An aspect of the present disclosure is to provide a golf ball and a method for manufacturing the same, the golf ball capable of efficiently converting impact energy transmitted to a golf ball into kinetic energy to minimize loss of driving distance, having a short skid section during putting, and being quickly convertible to forward spin.

Solution to Problem

According to an aspect of the present disclosure, a golf ball is provided, the golf ball including: a core having an average diameter of 37 to 39 mm, and a first density; a mantle having a thickness of 0.8 to 1.2 mm to surround the core, including amorphous alloy powder, and having a second density; and a cover having a thickness of 1 to 1.4 mm to surround the mantle, and a third density.

The second density may be lower than the first density and the third density.

The first density may be 1.10 to 1.20 (g/cm$^3$), the second density may be 0.95 to 1.15 (g/cm$^3$), and the third density may be 1.05 to 1.15 (g/cm$^3$).

Density of the amorphous alloy powder may be 6 to 8 (g/cm$^3$).

The amorphous alloy powder may be included in the mantle in an amount of 12 to 16 wt %, based on a weight of the mantle.

An average particle diameter of the amorphous alloy powder may be 10 μm to 50 μm.

Elastic moduli of the core, the mantle, and the cover may be sequentially lowered.

According to another aspect of the present disclosure, a method for manufacturing a golf ball may be provided, the method including: a core forming operation of preparing a rubber mixture for a core, press molding the rubber mixture for a core, and polishing the same to manufacture a core having an average diameter of 37 to 39 mm and a first density; a mantle forming operation of preparing a resin mixture for a mantle by mixing amorphous alloy power with a resin for forming a mantle, and injection molding the resin mixture for a mantle to surround the core and then polishing the same to obtain a mantle having a thickness of 0.8 to 1.2 mm and a second density; and a cover forming operation of preparing a mixture for forming a cover by mixing an additive with a resin for forming a cover, and casting molding the cover forming resin mixture to surround the mantle to obtain a cover having a thickness of 1 to 1.4 mm and a third density.

The second density may be lower than the first density and the third density.

The first density may be 1.10 to 1.20 (g/cm$^3$), the second density may be 0.95 to 1.15 (g/cm$^3$), and the third density may be 1.05 to 1.15 (g/cm$^3$).

Density of the amorphous alloy powder may be 6 to 8 (g/cm$^3$), an average particle diameter of the amorphous alloy powder may be 10 μm to 50 μm, and the amorphous alloy powder may be included in the resin mixture for a mantle in an amount of 12 to 16 wt %, based on a weight of the resin mixture for a mantle.

Advantageous Effects of Invention

As set forth above, according to an aspect of the present disclosure, a golf ball capable of effectively improved accuracy during putting while improving driving distance characteristics, and a method for manufacturing the same, may be provided.

The technical effect of the present invention is not limited to the above, and it can be interpreted as a concept including the effect that those skilled in the art can infer from the description described below.

BRIEF DESCRIPTION OF DRAWINGS

FIG. 1 is a schematic diagram of a heat treatment diagram of a conventional continuous annealing process (CAI).

BEST MODE FOR INVENTION

The present invention relates to a golf ball and a method for manufacturing the same, and preferred embodiments of the present invention will be described below. Embodiments of the present invention may be modified in various forms, and the scope of the present invention should not be construed as being limited to the embodiments described below. The present embodiments are provided to explain the present invention in more detail to those of ordinary skill in the art to which the present invention pertains.

Hereinafter, a golf ball according to an embodiment of the present disclosure will be described with reference to the drawings.

FIG. 1 is a cross-sectional view of a golf ball according to an embodiment of the present disclosure.

According to an aspect of the present disclosure, the golf ball may include a cover 10, a mantle 20, and a core 30.

The core 30 is located in an inner central portion of the golf ball according to the present disclosure, and may be provided in a spherical shape having a constant radius.

That is, the core 30 is an innermost structural layer including a central portion of the golf ball, may be provided in a spherical shape having an average diameter of 37 to 39 mm, and may be formed of a rubber material having elasticity.

A method for measuring an average diameter thereof is not particularly limited, and a method commonly applicable to those skilled in the art may be applied. As an example, an average value of a diameter of the core may be calculated by cutting a golf ball so that a center of the golf ball is located on a cutting surface, and measuring assuming two or more arbitrary straight lines passing through the center of the golf ball on the cutting surface.

In terms of securing elastic force of the golf ball, it is preferable that an average diameter of the core be 37 mm or more. However, when a diameter of the core is excessively increased, the performance of the golf ball may be deteriorated due to restrictions on settings of the thickness and density of the mantle and the cover. Therefore, the average diameter of the core may be limited to 39 mm or less.

In this case, the rubber material is not particularly limited as long as it is used as a material for the core 30 of a conventional golf ball, and any rubber material may be used. For example, natural rubber, synthetic rubber, and mixtures thereof may be used, preferably polybutadiene rubber, more preferably, cis-1,4-butadiene rubber having 40% or more cis bonds may be used.

In addition, when polybutadiene rubber is used as a rubber material, at least one selected from a group consisting of natural rubber, polyisoprene rubber, styrene-butadiene rubber, neoprene and Ethylene Propylene Diene Monomer (EPDM) may be mixed with polybutadiene rubber.

Meanwhile, when polybutadiene rubber is used as a rubber material, the density of polybutadiene is 0.91 (g/cm$^3$), so a filler may be used in the rubber material to control the density thereof. A filler generally used in the present disclosure may be used. The controlled density (a first density) of the core is preferably 1.10 to 1.20 g/cm$^3$.

It is preferable that the density of the core is 1.10 g/cm$^3$ or more in terms of increasing a driving distance due to securing a modulus of elasticity. However, when the density of the core is excessive, a moment of inertia (MOI) of the entire golf ball decreases and an amount of spin increases, and thus the total driving distance of the golf ball may decrease. Therefore, it is preferable to limit the density of the core to a range of 1.20 g/cm$^3$ or less.

Additional additives such as crosslinking agents and antioxidants commonly used in the core may also be used without limitation.

The mantle 20 is formed on an outer surface of the core 30 to have a thickness of 0.8 to 1.2 mm. A polymer used for the mantle 20 may be an ionomer resin or a polyester elastomer resin having highly elasticity, and a filler may be added to control the density of the mantle.

For example, as the ionomer resin having highly elasticity, Dupont SURLYN may be used, and as the polyester elastomer resin, KOLON PLASTIC KOPEL may be used. In the present disclosure, in order to easily control the density of the mantle 20, an ionomer resin or a polyester elastomer resin may be used. The ionomer resin may have a density of 1.0 g/cm$^3$ or less, and the polyester elastomer may have a density of 1.15 g/cm$^3$ or more.

The polymer of the mantle is formed by mixing amorphous alloy powder. By being mixed with the amorphous alloy powder, a modulus of elasticity of the mantle increases and an ability to convert impact energy into kinetic energy increases.

In this case, the amorphous alloy powder may have a density of 6 to 8 (g/cm$^3$), 12 to 16 wt % of the amorphous alloy powder is included in the mantle, and the amorphous alloy powder may have an average particle diameter of 10 μm to 50 μm. More preferably, the average particle diameter thereof may be 20 to 30 μm. In terms of securing the modulus of elasticity of the mantle, the density of the amorphous alloy powder is preferably 6 g/cm$^3$ or more, and the amorphous alloy powder is preferably included in the mantle in an amount of 12 wt % or more based on the weight of the entire mantle. However, when the density of the amorphous alloy powder is excessively high or the amorphous alloy powder is excessively added to the mantle, the modulus of elasticity of the mantle becomes higher than the modulus of elasticity of the core, so that an effect of increasing the driving distance may be offset, or the amorphous alloy powder may not be evenly dispersed in the polymer when manufacturing the mantle. Accordingly, the density of the amorphous alloy powder is preferably 8 g/cm$^3$ or less, and the amorphous alloy powder is preferably included in the mantle in a range of 16 wt % or less based on the weight of the entire mantle.

In terms of uniform dispersion of the amorphous alloy powder, the smaller an average particle diameter of the amorphous alloy powder is, the more advantageous it is. However, when the average particle diameter of the amorphous alloy powder is excessively small, an effect of increasing the modulus of elasticity compared to the amount of the amorphous alloy powder added may be insignificant, so that it is preferable that the amorphous alloy powder have an average particle diameter of 10 μm or more. Meanwhile, when the average particle diameter of the amorphous alloy powder is excessively large, irregular elasticity due to non-uniform dispersion of the amorphous alloy powder may occur, and thus the overall performance of the golf ball may be deteriorated. Therefore, it is possible to limit the average particle diameter of the amorphous alloy classification to a range of 50 μm or less.

In the present disclosure, a composition of the amorphous alloy powder is not particularly limited, but an iron-based amorphous alloy powder containing iron may preferably be used.

The composition of the amorphous alloy powder is not limited, but the amorphous alloy powder preferably includes iron to increase strength, chromium or molybdenum having corrosion resistance, and carbon, boron, or the like, to enhance amorphous forming ability. For example, based on 100 parts by weight of iron, powder including 25.4 to 55.3 parts by weight of the chromium content, and 35.6 to 84.2 parts by weight of the molybdenum content may be used.

A density (a second density) of the mantle is preferably 0.95 to 1.15 g/cm$^3$, and a thickness of the mantle is preferably 0.8 to 1.2 mm. Here, the thickness of the mantle may mean an average value of the thickness of the mantle measured at a plurality of points in a cross-section of the golf ball. Since the mantle has a lower density than the core or cover, it functions to balance an overall density as a whole. The density of the mantle is preferably 0.95 g/cm$^3$ or more, and the thickness of the mantle is preferably 1.2 mm or less in terms of increasing the driving distance according to the securing of the modulus of elasticity. Meanwhile, according to the research results of the inventors of the present invention, it could be confirmed that according to the research results of the inventors of the present invention, the density of the mantle containing the amorphous alloy powder is low and the thicker the mantle, the shorter a length of a skid section of the golf ball that occurs during putting. That is, in the present disclosure, the density of the mantle is limited to a range of 1.15 g/cm$^3$ or less, and the thickness of the mantle is limited to a range of 0.8 mm or more, so that rolling characteristics that the skid section of the golf ball is reduced during putting so that the golf ball rolls in the set direction may be effectively secured.

Therefore, the filler may be used separately to control the density of the mantle 20, but in some cases, the above-described amorphous alloy powder may perform a function of the filler.

A cover 10 having a thickness of 1 mm to 1.4 mm may be provided on an outer surface of the mantle 20. A thickness of the cover may also mean an average value of the thickness of the cover measured at a plurality of points in a cross-section of the golf ball. A dimple may be formed on a surface of the cover 10.

The cover may be formed of an ionomer or urethane resin depending on the hardness characteristics of the ball to be manufactured, and may include fillers and pigments.

A density (a third density) of the cover may be 1.05 to 1.15 g/cm$^3$. In terms of durability and modulus of elasticity, the density of the cover is preferably 1.05 g/cm$^3$ or more. Meanwhile, when the density of the cover is excessively high, it is preferable that the density of the cover is 1.15 g/cm$^3$ or less, because the elastic force of the core is offset and the driving distance of the golf ball is rather reduced. In addition, in order to optimize a modulus of elasticity of the golf ball, an amount of spin and a skid section, it is preferable that the third density of the cover is the same as or lower than the first density of the core, and it is more preferable that the third density of the cover is higher than the second density of the mantle. In addition, it is preferable that the modulus of elasticity of the cover is lower than the modulus of elasticity of the core and the mantle in order to optimize the modulus of elasticity of the golf ball, the amount of spin and the skid section.

It is preferable that the thickness of the cover be 1 mm or more in terms of durability and securing the modulus of elasticity. Meanwhile, when the thickness of the cover is excessively thick, a proportion of the mantle and the core in the golf ball is reduced, so that a desired modulus of elasticity may not only be secured, but also there may be a case in which a skid section increases, so that the thickness of the cover may preferably be in the range of 1.4 mm or less.

According to another aspect of the present disclosure, a method for manufacturing a golf ball includes a core forming operation, a mantle forming operation, and a cover forming operation.

The core forming operation is an operation of manufacturing a core of a golf ball, by preparing a rubber mixture for a core by mixing butadiene, a filler, and an additive of an antioxidant with a kneader in a rolling mill, and press molding and polishing the rubber mixture for a core.

The core provided through press molding and polishing may satisfy a density (first density) of 1.10 to 1.20 g/cm$^3$ and an average diameter of 37 to 39 mm.

In the mantle forming operation, a resin mixture for a mantle is prepared by mixing amorphous alloy powder with an ionomer resin or polyester elastomer resin, which is a resin for forming a mantle, and injection-molding the resin mixture for a mantle surrounding the core, and then polishing to obtain a mantle. The amorphous alloy powder used in the mantle forming operation may be amorphous alloy powder having the aforementioned particle size and physical properties. An injection-molded and polished mantle may satisfy a density (second density) of 0.95 to 1.15 g/cm$^3$ and a thickness of 0.8 to 1.2 mm.

In the cover forming operation, an additive may be mixed with an ionomer resin or urethane resin, which is a resin for forming a cover, to prepare a mixture for forming a cover, and a resin mixture for forming a cover may be cast or injection molded to surround the mantle.

Thereafter, a wrinkled portion of the cover may be trimmed and surface-treated to form a coating layer, and then marked with a printing machine and the quality thereof may be inspected to manufacture a golf ball. In the finally manufactured golf ball, a density (third density) of the cover may satisfy a range of 1.05 to 1.15 g/cm$^3$, and the thickness of the cover may satisfy a range of 1 to 1.4 mm.

DESCRIPTION OF REFERENCE NUMERALS

10: Cover
20: Mantle
30: Core

MODE FOR INVENTION

Hereinafter, the present disclosure will be described in more detail through examples. However, it should be noted that the following examples are for illustrative purposes only and are not intended to limit the scope of the present disclosure. The scope of the present disclosure may be determined by matters described in the claims and matters able to be reasonably inferred therefrom.

Example

After preparing a rubber mixture for a core by uniformly mixing polybutadiene rubber, filler, and antioxidant in a kneader and a rolling mill, press molding and polishing the rubber mixture for a core to form a golf ball core having the diameter and density shown in Table 1 was manufactured. The density of the core was controlled by adjusting an amount of added filler.

Thereafter, an ionomer resin, a filler, and an amorphous alloy powder were added to prepare a resin composition for a mantle, and then the resin composition for a mantle was injection molded and ground to obtain a mantle having the thickness shown in Table 1. The amorphous alloy powder included in an amount of 25.4 to 55.3 parts by weight of chromium and 35.6 to 84.2 parts by weight of molybdenum with respect to 100 parts by weight of iron, and an amorphous alloy powder containing a trace amount of other boron or carbon was used, and an average particle size of the amorphous alloy powder was controlled to about 30 μm and then added to the resin composition. In the case of No. 10, the density of the mantle was slightly lowered by using an amorphous alloy powder with a density of 5 g/cm$^3$, and in the case of No. 11, the density of the mantle was slightly higher by using an amorphous alloy powder with a density of 9 g/cm$^3$. For the remaining golf balls, a mantle was manufactured using an amorphous alloy powder having a density of 7 g/cm$^3$. The amorphous alloy powder was added to the resin composition for a mantle to satisfy the weight of 14 wt %, based on the weight of the resin composition for a mantle.

Next, a resin mixture for a cover was prepared using an ionomer and an additive. A cover having the thickness and density shown in Table 1 was formed by casting and polishing a resin mixture for a cover to surround an outer surface of a mantle including the core. The density of the cover was controlled by adjusting an amount of added filler.

TABLE 1

| | Core | | Mantle | | Cover | | |
|---|---|---|---|---|---|---|---|
| No. | Diameter (mm) | Density (g/cm$^3$) | Thickness (mm) | Density (g/cm$^3$) | Thickness (mm) | Density (g/cm$^3$) | Reference |
| 1 | 38 | 1.14 | 1.2 | 0.95 | 1.39 | 1.12 | Inventive Example |
| 2 | 38.3 | 1.17 | 1.0 | 1.0 | 1.23 | 1.14 | Inventive Example |
| 3 | 39 | 1.2 | 0.8 | 1.15 | 1.02 | 1.15 | Inventive Example |
| 4 | 36.5 | 1.14 | 2.2 | 1.0 | 1.23 | 1.14 | Comparative Example |
| 5 | 40 | 1.14 | 0.7 | 1.0 | 1.03 | 1.14 | Comparative Example |
| 6 | 38.3 | 1.05 | 1.0 | 1.0 | 1.23 | 1.14 | Comparative Example |
| 7 | 38.3 | 1.25 | 1.0 | 1.0 | 1.23 | 1.14 | Comparative Example |
| 8 | 38.8 | 1.14 | 0.6 | 1.0 | 1.23 | 1.14 | Comparative Example |
| 9 | 38.3 | 1.14 | 1.4 | 1.0 | 1.23 | 1.14 | Comparative Example |
| 10 | 38.3 | 1.14 | 1.0 | 0.85 | 1.23 | 1.14 | Comparative Example |
| 11 | 38.3 | 1.14 | 1.0 | 1.25 | 1.23 | 1.14 | Comparative Example |
| 12 | 39 | 1.14 | 1.0 | 1.0 | 0.82 | 1.14 | Comparative Example |
| 13 | 38.3 | 1.14 | 1.0 | 1.0 | 1.53 | 1.14 | Comparative Example |
| 14 | 38.3 | 1.14 | 1.0 | 1.0 | 1.23 | 1.02 | Comparative Example |
| 15 | 38.3 | 1.14 | 1.0 | 1.0 | 1.23 | 1.25 | Comparative Example |

Using the same swing robot as a product by Golf Laboratories used in R&A and USGA, a driver driving distance test (head speed 100 MPH simulation) of golf balls provided according to the conditions in Table 1 was conducted, and by measuring a ball speed (MPH), launch angle (°), total spin (RPM), carry distance (Carry, m) and total distance (Total, m) of each golf ball, the results were shown in Table 2.

In addition, a putting stroke test (simulation of putter speed 3 MPH) of golf balls manufactured under the conditions of Table 1 was additionally tested using a putter swing robot, and a skid distance (Skid, m) from a striking point of the respective golf balls through a back spin section to a point converted to a forward spin was measured and described together in Table 2,

TABLE 2

| No. | Driver driving distance test | | | | | Putting test | Reference |
| | Ball Speed (MPH) | Launch Angle (°) | Total Spin (RPM) | Carry (m) | Total (m) | Skid (m) | |
| --- | --- | --- | --- | --- | --- | --- | --- |
| 1 | 148.5 | 12.9 | 2282 | 230.5 | 249.2 | 0.45 | Inventive Example |
| 2 | 148.9 | 13.0 | 2273 | 232.1 | 251.6 | 0.44 | Inventive Example |
| 3 | 149.0 | 12.9 | 2275 | 231.3 | 250.4 | 0.46 | Inventive Example |
| 4 | 143.3 | 12.7 | 2312 | 225.3 | 239.7 | 0.52 | Comparative Example |
| 5 | 144.5 | 12.9 | 2820 | 219.4 | 235.1 | 0.49 | Comparative Example |
| 6 | 144.6 | 12.7 | 2241 | 224.7 | 237.5 | 0.49 | Comparative Example |
| 7 | 147.2 | 12.8 | 2632 | 226.1 | 238.6 | 0.47 | Comparative Example |
| 8 | 146.7 | 12.8 | 2412 | 229.5 | 246.1 | 0.82 | Comparative Example |
| 9 | 143.3 | 12.7 | 2374 | 217.7 | 232.5 | 0.45 | Comparative Example |
| 10 | 143.8 | 12.7 | 2406 | 221.4 | 235.2 | 0.47 | Comparative Example |
| 11 | 147.4 | 12.9 | 2373 | 229.6 | 245.8 | 0.89 | Comparative Example |
| 12 | 144.6 | 12.8 | 2369 | 227.5 | 235.7 | 0.50 | Comparative Example |
| 13 | 144.7 | 12.9 | 2357 | 225.2 | 238.2 | 0.73 | Comparative Example |
| 14 | 143.9 | 12.7 | 2442 | 227.3 | 239.4 | 0.47 | Comparative Example |
| 15 | 142.7 | 12.9 | 2347 | 224.9 | 237.6 | 0.42 | Comparative Example |

According to Tables 1 and 2, in Inventive Examples satisfying the thickness and density of the core, the mantle, and the cover limited by the present invention, it can be seen that a ball speed, which is a major factor determining a driving distance of a golf ball, increases and an amount of spin decreases, so that a total distance of 240 m or more and a skid distance of 0.7 m or less are satisfied at the same time. On the other hand, in Comparative Examples not satisfying at least one of the thickness and density of the core, the mantle, and the cover limited by the present invention, it can be seen that a total distance of 240 m or more and a skid distance of 0.7 m or less are not satisfied at the same time.

Accordingly, according to an aspect of the present disclosure, it is possible to provide a golf ball capable of effectively improved accuracy during putting while improving driving distance characteristics and a method for manufacturing the same.

While example embodiments have been shown and described above, it will be apparent to those skilled in the art that modifications and variations could be made without departing from the scope of the present disclosure as defined by the appended claims.

The invention claimed is:

1. A golf ball, comprising:
    a core having an average diameter of 37 to 39 mm, and a first density;
    a mantle having a thickness of 0.8 to 1.2 mm to surround the core, including amorphous alloy powder, and having a second density; and
    a cover having a thickness of 1 to 1.4 mm to surround the mantle, and a third density,
    wherein
    the first density is 1.10 to 1.20 (g/cm$^3$),
    the second density is 0.95 to 1.15 (g/cm$^3$), and
    the third density is 1.05 to 1.15 (g/cm$^3$).

2. The golf ball of claim 1, wherein the second density is lower than the first density and the third density.

3. The golf ball of claim 1, wherein density of the amorphous alloy powder is 6 to 8 (g/cm$^3$).

4. The golf ball of claim 3, wherein the amorphous alloy powder is included in the mantle in an amount of 12 to 16 wt %, based on a weight of the mantle.

5. The golf ball of claim 1, wherein an average particle diameter of the amorphous alloy powder is 10 μm to 50 μm.

6. A method for manufacturing a golf ball, comprising:
    a core forming operation of preparing a rubber mixture for a core, press molding the rubber mixture for a core, and polishing the same to manufacture a core having an average diameter of 37 to 39 mm and a first density;

a mantle forming operation of preparing a resin mixture for a mantle by mixing amorphous alloy power with a resin for forming a mantle, and injection molding the resin mixture for a mantle to surround the core and then polishing the same to obtain a mantle having a thickness of 0.8 to 1.2 mm and a second density; and a cover forming operation of preparing a mixture for forming a cover by mixing an additive with a resin for forming a cover, and casting molding the resin mixture for forming a cover to surround the mantle to obtain a cover having a thickness of 1 to 1.4 mm and a third density, wherein the first density is 1.10 to 1.20 (g/cm$^3$), the second density is 0.95 to 1.15 (g/cm$^3$), and the third density is 1.05 to 1.15 (g/cm$^3$).

7. The method for manufacturing a golf ball of claim 6, wherein the second density is lower than the first density and the third density.

8. The method for manufacturing a golf ball of claim 6, wherein density of the amorphous alloy powder is 6 to 8 (g/cm$^3$), an average particle diameter of the amorphous alloy powder is 10 μm to 50 μm, and the amorphous alloy powder is included in the resin mixture for a mantle in an amount of 12 to 16 wt %, based on a weight of the resin mixture for a mantle.

\* \* \* \* \*